United States Patent
Skowronek

(10) Patent No.: US 7,774,076 B2
(45) Date of Patent: Aug. 10, 2010

(54) SYSTEM AND METHOD FOR VALIDATION OF TRANSACTIONS

(75) Inventor: Dan Skowronek, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/926,723

(22) Filed: Oct. 29, 2007

(65) Prior Publication Data

US 2009/0112765 A1   Apr. 30, 2009

(51) Int. Cl.
*G06Q 40/00* (2006.01)
(52) U.S. Cl. .......................................... 700/44
(58) Field of Classification Search .............. 705/1–45; 235/492, 380; 305/199; 340/426; 379/111, 379/265; 463/25; 455/558; 713/168; 725/50
See application file for complete search history.

(56) References Cited

U.S. PATENT DOCUMENTS

| | | | |
|---|---|---|---|
| 7,480,631 B1 | 1/2009 | Merced et al. | |
| 2002/0035539 A1* | 3/2002 | O'Connell | 705/39 |
| 2002/0143655 A1* | 10/2002 | Elston et al. | 705/26 |
| 2003/0144952 A1* | 7/2003 | Brown et al. | 705/40 |
| 2004/0030601 A1* | 2/2004 | Pond et al. | 705/16 |
| 2006/0085357 A1* | 4/2006 | Pizarro | 705/64 |
| 2007/0174082 A1* | 7/2007 | Singh | 705/1 |
| 2007/0175978 A1* | 8/2007 | Stambaugh | 235/379 |
| 2007/0262134 A1* | 11/2007 | Humphrey et al. | 235/379 |

OTHER PUBLICATIONS

Prepaid Mobile Network Service Card, Salonikios George, 3B A. Tasou, Shop 3B, 3046 Limassol, CY, 2004.*
Author Unknown, Chase Fraud Detector Features & Benefits, https://www.chasefrauddetector.com/featuresbenefits.cfm, printed Feb. 26, 2009, 2 pages.
U.S. Appl. No. 60/911,113, filed Apr. 11, 2007.
U.S. Appl. No. 11/830,420, filed Jul. 30, 2007.

* cited by examiner

*Primary Examiner*—James P Trammell
*Assistant Examiner*—Tien C Nguyen
(74) *Attorney, Agent, or Firm*—Townsend and Townsend and Crew LLP

(57) ABSTRACT

A financial institution may flag suspicious transactions that are conducted using an NFC-enabled mobile phone. The account holder establishes a second PIN that is separate from the primary PIN used by the customer to authenticate transactions. When a transaction is flagged, a message is sent to the customer at the mobile phone requesting entry of the second PIN. If the second PIN is not correctly entered, activity on the account is suspended.

25 Claims, 4 Drawing Sheets

SYSTEM AND METHOD FOR VALIDATION OF TRANSACTIONS

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

Credit cards, debit cards and other financial cards and presentation instruments are widely used by consumers as a convenient way to conduct financial transactions. Such cards and their associated accounts have been made even more convenient with the introduction of wireless devices that store and use account information or identification. Mobile phones, PDAs, key fobs and other devices incorporate features using RFID (Radio Frequency ID) or NFC (Near Field Communications) signaling to permit a cardholder to conduct a transaction by placing the device near an RFID reader, e.g. at a retail POS system at a merchant location.

Unfortunately, presentation instruments built into wireless or other mobile devices have increased the risk of fraudulent transactions. As an example, when a mobile phone employing RFID or NFC features is used by a consumer, the user places the phone near a reader, and after the reader at the POS system identifies the user and initiates a transaction, the user is typically required to enter a PIN (personal identification number) known only to the user and thereby enabling the user to authenticate himself or herself and the transaction. Unfortunately, thieves have devised various means to steal PIN information, such as by surreptitiously watching a person entering a PIN at the phone or a PIN pad. If the mobile phone is then stolen, it may be used with the stolen PIN to conduct transactions.

BRIEF SUMMARY OF THE INVENTION

There is provided, in accordance with embodiments of the present invention, a system and method for establishing PINs in connection with a presentation instrument. In one embodiment of the invention, one PIN is a primary PIN used by a customer to authenticate a transaction at the time the transaction is being conducted. The other PIN is a post-transaction PIN used by the customer for subsequently validating a previously conducted transaction (e.g., a completed transaction that has been "flagged" as suspicious).

In some embodiments, a system and method is provided for validating transactions that are conducted against an account using a mobile (customer) device as a presentation instrument, where a customer may or may not be required to provide an authenticating PIN in order to authenticate and complete the transaction. A database (memory) stores in relation to the account a second, post-transaction (validation) PIN. The mobile device receives a message requesting the customer enter the second PIN when a transaction that has been successfully completed with the authenticating PIN has been subsequently flagged (as suspicious). A server (processor) receives the second PIN entered at the mobile device and the second PIN stored in the database, and determines if the entered second PIN matches the stored second PIN.

A more complete understanding of the present invention may be derived by referring to the detailed description of the invention and to the claims, when considered in connection with the Figures.

DETAILED DESCRIPTION OF THE INVENTION

Figure 1:
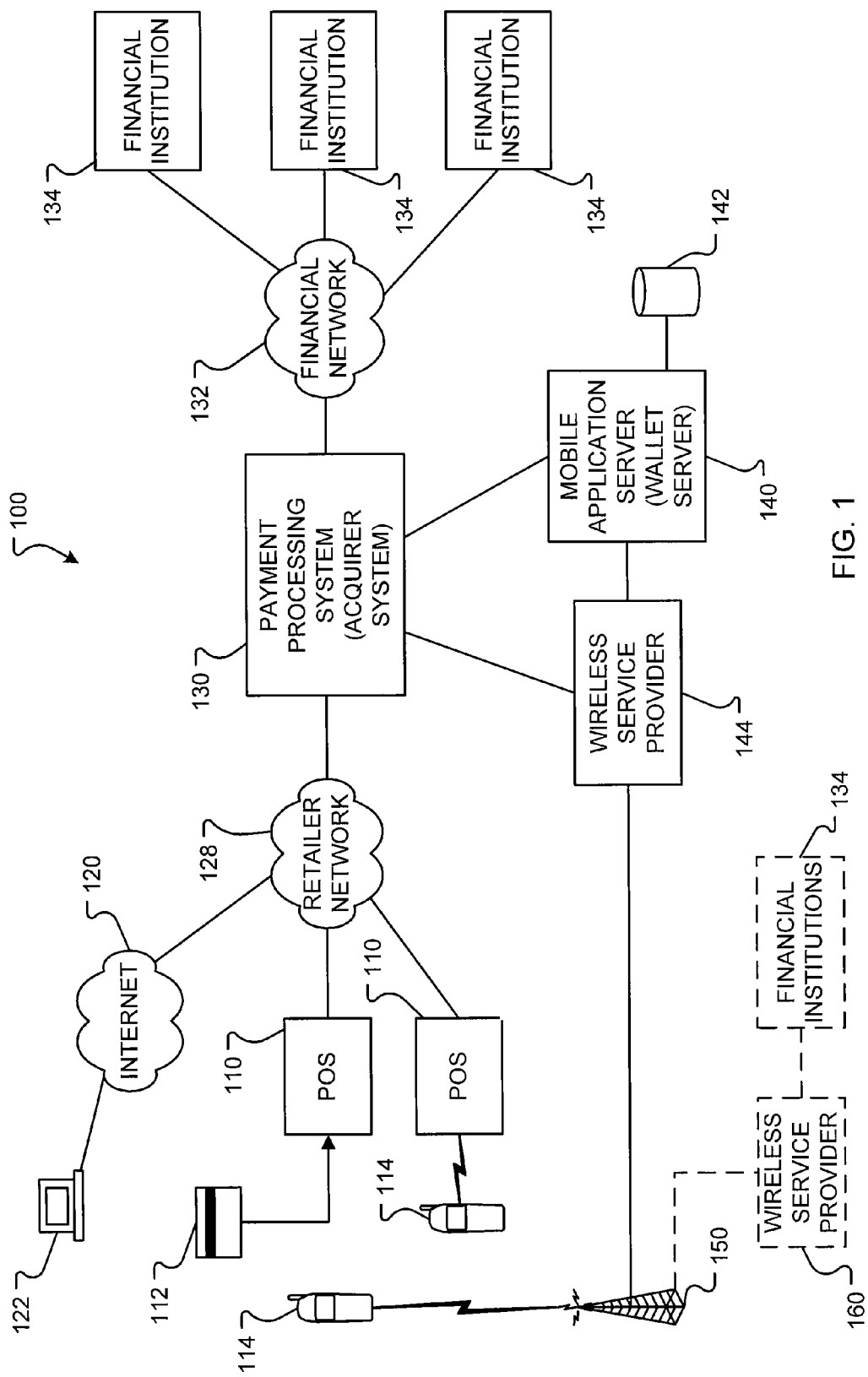
FIG. 1 is a general block diagram illustrating a network where transactions are conducted using wireless telephones, according to embodiments of the preset invention.

There are various embodiments and configurations for implementing the present invention. One such implementation is shown in FIG. 1, where a network 100 is used for conducting transactions at POS terminals 110. In some cases, customers may use a payment or presentation instrument in the form of a financial card 112 (such as a traditional credit card or debit card). In other cases, transactions may be conducted by a customer over the internet 120 using a personal computer 122 or other input device. In yet other cases, and as will be more fully described later, a customer may use a payment or presentation instrument in the form of a mobile telephone 114 (or other mobile device, such as a PDA, pocket computer, RFID transponder, etc.).

Transaction data at the POS terminals 110 is passed through a retailer network 128 to a payment processing or acquirer system 130. The acquirer system 130 passes the transaction data (e.g., account number, product being purchased, purchase price) through a financial (debit/credit) network 132 to one of the financial institutions 134 that maintains the account associated with the payment instrument, where the transaction is either approved or declined. If a mobile phone is being used, the transaction may be completed using a mobile application server (wallet server) 140 (and its associated database 142), and a wireless service provider 144, which communicates with mobile phones 114 through a wireless communications network 150.

The operation of the network 100 as thus far described is known. For example, if one of the mobile phones 114 is used as a payment instrument, an identifier (device ID, phone number, account ID/number) may be transmitted wirelessly (RFID or NFC signaling) from the phone 114 to a reader (e.g., an RFID reader) at one of the POS terminals 110. In response to the identifier, the acquirer system 130 accesses the server 140 to retrieve at database 142 account information associated with the phone 114 (in some cases, there is more than one account used by the customer and the identifier may be used to access account information for the specific account to be used). The acquirer system 130 communicates through provider 144 and network 150 to have the customer confirm the transaction and the account being used, and to request that a primary, authenticating PIN (known only to the customer) be entered. In some implementations, the authenticating PIN might be entered at the phone and communicated through the network 150 to the acquirer 130. In other implementations, the PIN might entered at a secure PIN pad (not shown) at the POS terminal, from where it is provided to the acquirer. The transaction data and the entered PIN are then provided by the acquirer system 130 to the customer's financial institution 134 for approval.

Various systems and methods for using wireless telephones at POS terminals to conduct transactions (including the type of system and method as described above) can be found in U.S. patent application Ser. No. 10/969,780, entitled "Methods and Systems for Performing Credit Transactions With a Wireless Device," filed Oct. 19, 2004, by Christian Pizarro et al., U.S. patent application Ser. No. 11/382,647, entitled "System And Method For Activating Telephone-Based Payment Instrument," filed May 10, 2006, by Wendy Humphrey et al., U.S. Provisional Patent Application No. 60/911,113, entitled "Mobile Commerce Infrastructure Systems and Methods," filed Apr. 11, 2007, by Brian Friedman, U.S. patent application Ser. No. 11/830,420, filed Jul. 30, 2007, entitled "Provisioning Of a Device for Mobile Commerce" by Steven E. Arthur et al., and U.S. Patent Application Publication No. 2004/0030601, entitled "Electronic Payment Methods for a Mobile Device," filed Aug. 6, 2003, by Russell L. Pond et al., each of which is hereby incorporated by reference.

In one embodiment herein, NFC signaling (involving transmissions over very short distances) is used as the communications technology for passing data between the mobile phone 114 and the POS terminal 110. However, other forms of wireless technology could also be used, such as infrared, BlueTooth, standard radio signaling, WiFi, WiMax, Ultra-wideband, and so forth.

An exemplary embodiment of the invention will now be described with reference to FIGS. 2 and 3, in conjunction with FIG. 1. In such embodiment, the customer or user enrolls in a program for receiving transaction alerts at his/her mobile phone when a previously completed transaction has been flagged (as suspicious) by his/her financial institution, and the customer, in response to the alert, validates the transaction by using a secondary (validation) PIN that is separate from and different than the primary (authentication) PIN that may have been used by the customer when conducting the transaction.

It is assumed for purposes of this exemplary embodiment that the customer uses a mobile phone 114 as a payment instrument and the customer has activated the phone for such use and the phone has been provisioned with the necessary account number(s) or identifiers to conduct transactions. For examples of systems for activating and provisioning mobile phones, reference can be made to the aforementioned application Ser. Nos. 11/382,647 and 11/830,420. However, as will be described later, the invention may also be used in conjunction with other kinds of transactions, such as one where a physical (e.g., plastic) card is used or where a transaction is conducted on-line by entering a card number remotely at personal computer.

Initially, and prior to receiving transaction alerts, the customer must first enroll in a program for receiving such alerts. The alerts typically originate with the financial institution 134 managing the customer's account (as will be described in greater detail later). In one described embodiment, such alerts are sent from the financial institution to the customer via the wallet server 140, service provider 144 and communications network 150. However, in other embodiments, the alerts may be sent directly from the financial institution through a separate, alternate wireless service provider 160 used by the financial institution (see FIG. 1) and then over network 150 to the customer.

Figure 2:
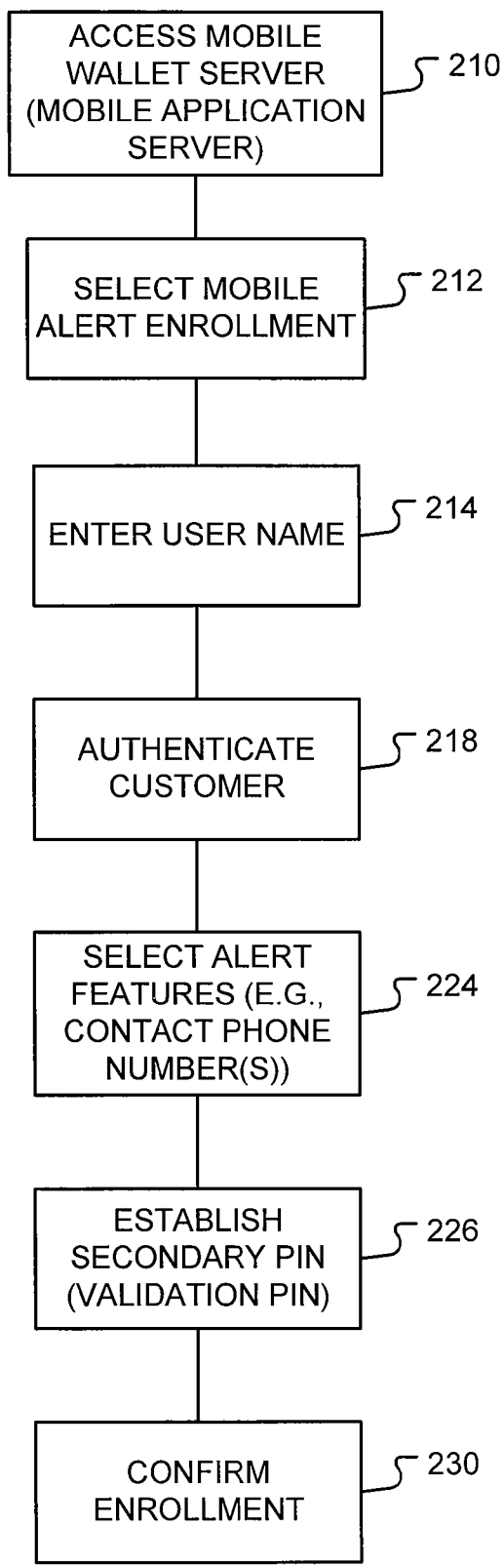
FIG. 2 is a flow diagram illustrating a process for enrolling in a program for transaction alerts, in the network of FIG. 1.

In order to enroll for transaction alerts, a method as illustrated in FIG. 2 may be employed. Initially, a customer accesses the wallet server 140 at step 210. Such access can be by way of a website maintained by the entity operating the server 140, with the customer using a personal computer or a web-enabled feature on telephone 114. At the website, the customer first makes a selection at step 212 to enroll for transaction alerts (the website could be accessed for other purposes, such as activating the phone, changing or updating accounts, and so forth). The customer then enters his/her user name at step 214 (this could be a previously selected name or a word, or could be number, such as the phone number of the mobile phone 114 being used as a payment instrument). Next, the customer authenticates himself/herself, at step 218. This could be done by entry of the primary authentication PIN (the same PIN used to authenticate the customer when conducting transactions). Alternatively, it could be other forms of authentication, such as a social security number, birth date, or other password established by the operator of the wallet server or the financial institution, and known to the customer. The primary PIN (and other information entered at the multiple phone 114) may be encrypted and sent over a secure communications channel to the wallet server and, if appropriate, from there to the customer's financial institution for approval. The customer then selects (step 224) various features and options available in connection with transaction alerts. As examples, the customer could provide a phone number to where alerts are to be sent (if not to the phone 114), additional or secondary phones to receive each alert, the physical address for mailed written confirmation of each alert, and so forth.

Next, at step 226, the customer establishes a secondary or validation PIN which is to be used by the customer when validating a transaction in response to a transaction alert. In some embodiments, this step may be implemented using a web page requesting the customer enter the validation PIN twice in order to insure proper entry by the customer. In some cases, the server 140 will have a desired format for the validation PIN (e.g., a required number of digits or alphanumeric characters), and the server 140 will only accept a validation PIN meeting those requirements. Once the PIN has been accepted and established at the server 140, a message or screen confirming enrollment will be displayed to the customer at step 230.

In some embodiments, the validation PIN is stored at the financial institution (rather than the wallet server 140 data base 142), and the wallet server acts only as a conduit for passing alerts (as well as PINs and other information) between the customer and the financial institution.

Also, in some embodiments, the enrollment for transaction alerts (as well as the alerts themselves) might be established directly with the customer's financial institution 134, and in such case steps analogous to those illustrated in FIG. 2 could be carried out by the user at a website operated by the financial institution rather than the wallet server 140. Further, if the validation PIN is not established in person (e.g., at the financial institution and at the time the account is set up), the financial institution may require that the second PIN not be established until a predetermined period of time after the mobile phone has been activated, to assure that the phone 114 is not being activated and a validation PIN established by someone other than the account holder.

While FIG. 2 illustrates steps that could be carried out at by accessing a website maintained at the wallet server (or at one of the financial institutions 134), other processes could be used for enrollment. For example, the customer could enroll over the phone using an interactive voice response system (IVR), could enroll as part of the activation of a mobile phone as a payment instrument, or could enroll in person (e.g., at a bank when an account is set up). Further, while the enrollment for receiving alerts in FIG. 2 is anticipated as voluntary, in some instances the financial institution managing the account might require enrollment for some or all customers as a cost savings program (in order to eliminate the overhead costs associated with an employee otherwise having to manually call the customer when a transaction is flagged).

Figure 3:
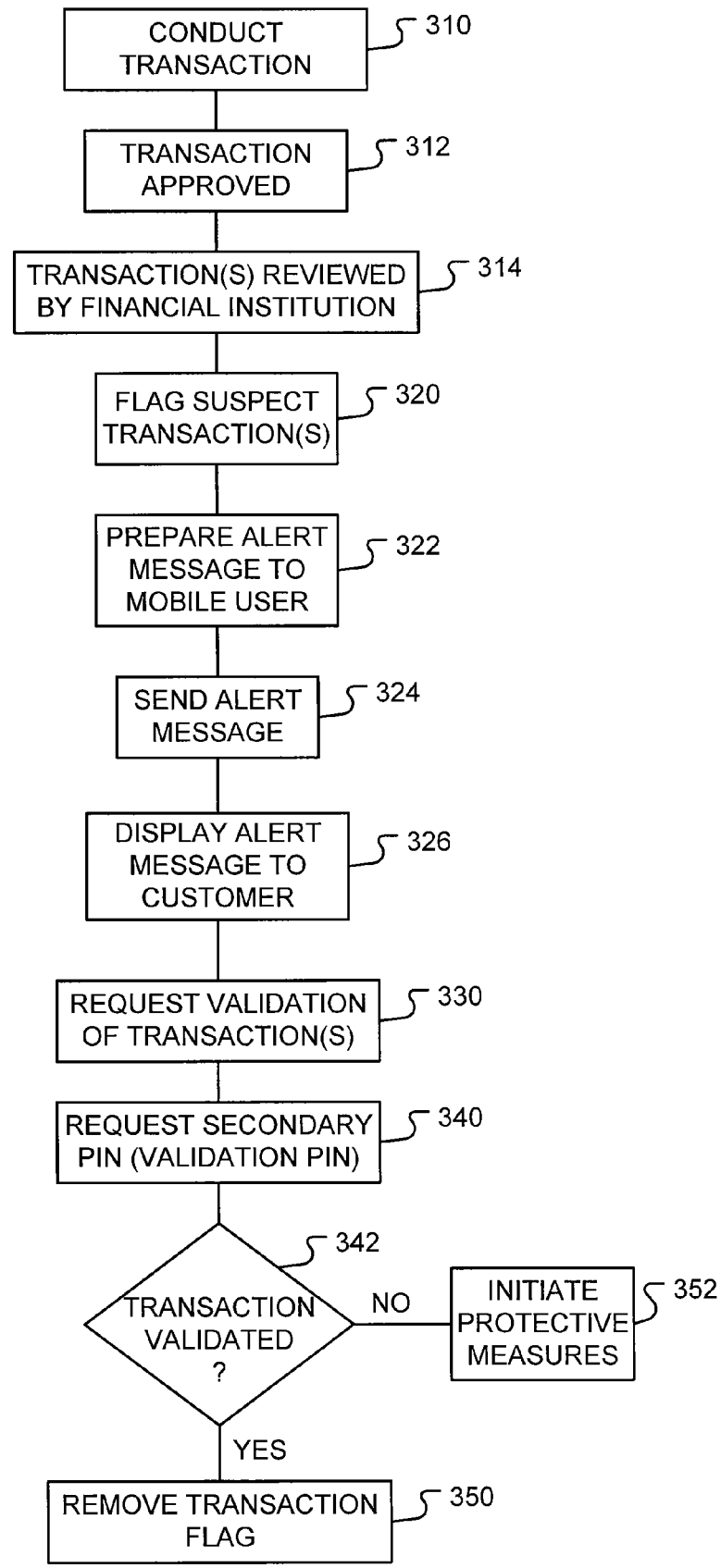
FIG. 3 is a flow diagram illustrating a process for conducting a transaction and then later validating it with a secondary PIN, in the network of FIG. 1.

FIG. 3 illustrates the steps involved when a transaction has been conducted in the network 100 of FIG. 1, and a transaction alert has been subsequently sent to the customer at mobile phone 114 in response to the transaction being flagged (as suspicious) for follow-up by the responsible financial institution 134.

Initially, at step 310, the transaction is conducted at a POS terminal 110 in the manner described earlier. The transaction in this case requires the entry of a primary authentication PIN, which is assumed to have been correctly entered and the transaction approved or completed by the financial institution, at step 312. As mentioned earlier, there may be some instances where an authentication PIN may not be required, such as when a customer is using a card in person at a merchant and completes the transaction with, for example, a signature. The completed transaction (as well as other transactions) is subsequently reviewed (step 314) by the issuer or financial institution for suspicious circumstances or activity, according to predetermined criteria. Such criteria would be established by the issuer, and may take into account the location of the purchase, the amount of the transaction, the frequency of this and other transactions, as well as other factors. In some cases, any one or more transactions for an account may be flagged due to circumstances other than those surrounding a specific transaction, e.g. when the account holder (or someone purporting to be the account holder) has requested a significant change in credit limits, when there has been a requested change of the account holder address to a suspicious address, and so forth.

It is assumed in FIG. 3 that the transaction in question has been determined to be suspect using predetermined criteria, and is flagged by the financial institution at step 320.

The financial institution prepares an alert message concerning the transaction, with appropriate transaction detail, and such alert is provided to the wallet server 140 (step 322). The wallet server accesses the data established by the customer for receiving alerts (e.g., mobile phone number), and sends the alert to the customer at step 324. In one embodiment, the alert is sent as a Short Message Service (SMS) message to mobile phone 114. The message is displayed to the customer at the mobile phone (step 326), and the message requests validation of the suspect transaction by the customer at step 330.

In alternative embodiments, the alert message could be sent directly from the financial institution to the customer using wireless service provider 160.

The alert message asks that the customer enter the previously established secondary (validation) PIN at step 340. Such PIN is returned to the wallet server by a reply SMS message from the phone and the wallet server checks the PIN against the established PIN (stored in database 142) to determine correct entry of the PIN (step 342). If the transaction has been validated (by correct entry of the validated PIN), the wallet server returns a message to the financial institution in order to remove the flag (step 350). However, if not validated, protective measures are instituted relative to the account.

Various additional or substitute steps could be implemented, depending on the desires of the financial institution or wallet server operator. For example, the wallet server may use a default condition (failure to validate) if the correct PIN is not entered at the mobile phone within a pre-established period of time, say, one minute after the alert is received. As another example, the wallet server may permit an incorrect PIN to be entered, say, one time, with a request for re-entry sent immediately in a subsequent message to the mobile phone. If the PIN is not entered correctly the second time, or no response to the second message is received within a pre-established period of time, the transaction is considered not to be validated and protective measures are taken.

The protective measures taken by the financial institution (for failure to validate) may vary, according to circumstances and the policies established by the financial institution. For example, all activity for the account may be suspended until direct, person-to-person contact is made with the account holder, to make sure that the mobile phone (or other payment instrument) has not been stolen or used by an unauthorized person. A second alert having a status message could be sent to the mobile phone, informing the customer of the suspension and asking that the customer call the financial institution. Such measures could resolve the suspension if the customer has inadvertently not responded to the alert (e.g., the phone has been turned off), and the customer sees the status message later when the phone is turned on.

Figure 4:
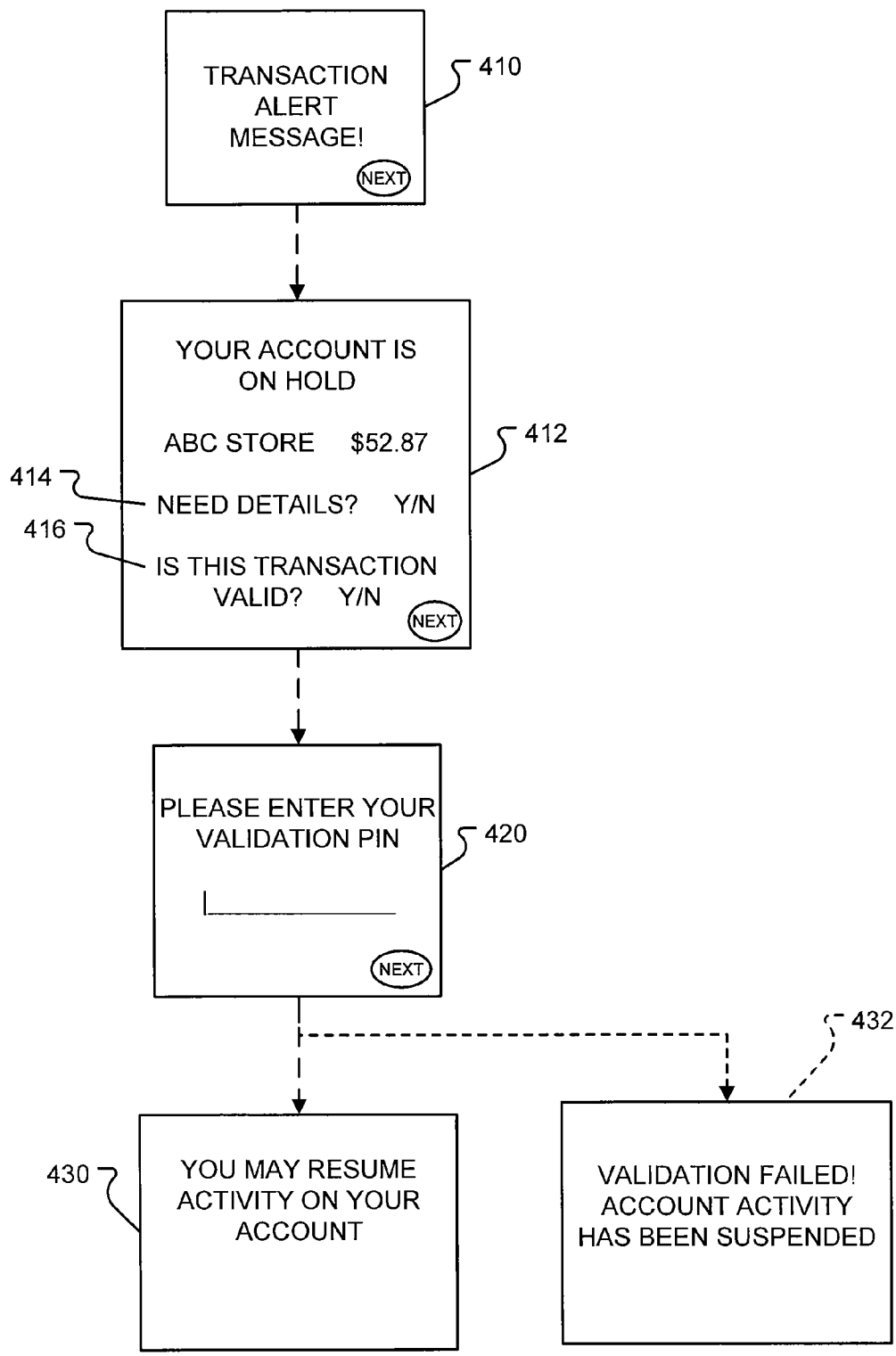
FIG. 4 illustrates screens seen at a mobile phone when validating a transaction in response to a transaction alert.

FIG. 4 illustrates screens that might be seen at the mobile phone 114 when a transaction alert is sent. As illustrated, the initial screen 410 alerts the customer that a message had been received. At the next screen 412, brief details of the transaction are displayed, with the customer being given an entry field 414 for requesting further details (Y/N). If no details are requested, the customer is given an entry field 416 for entering a selection (Y/N) as to whether the transaction is valid.

At the next screen 420, the customer is requested to enter the validation PIN (established at step 226, FIG. 2). While not seen in the illustrated screen 420, the customer may be reminded by a prompt that this PIN is not the primary PIN used by the customer to authenticate and complete transactions. If the proper validation PIN is entered, the next screen 430 informs the customer that transaction activity may now be continued. However, if the correct validation PIN is not entered (or not entered within a required period of time), an alternative screen 432 may be displayed, indicating the validation has failed and the account is being suspended. Other messages or information could be provided to the customer, such as, e.g., a screen providing a number to call at the financial institution for resolution of the suspension, if the validation has failed.

It can be seen from the preceding discussion that the present invention provides a novel method and system for validating suspect transactions through the use of a validation PIN that is separate and apart from the authentication PIN used by a customer to authenticate or complete a transaction. While detailed descriptions of presently preferred embodiments of the invention have been given above, various alternatives, modifications, and equivalents will be apparent to those skilled in the art without varying from the spirit of the invention. For example, the exemplary processes described herein, such as the flow diagram in FIG. 4, are only illustrative of processes that could be carried out by program steps within the network 100. Additional steps may be performed, some steps deleted, and the order of the steps may be changed. As a further example, while the alert messaging could be text only, it may be advantageous for the screens seen by the customer (such as those illustrated in FIG. 4) to include graphics or other unique displays for security purposes. As a specific example, the customer could be instructed (when enrolling) not to respond to alert messages without seeing a distinctive card issuer logo or other authenticating data, to reduce the risk of an imposter sending a message in order to request entry of the validation PIN (and then use that PIN to fraudulently validate subsequent transactions). This could be implemented by an application or applet loaded onto the phone, which displays the proper information and that can only be executed by an authentic transaction alert (i.e., one properly encoded with commands as part of an SMS message from the server 140). The application implementing such features could be loaded onto the phone through an SMS message sent at the time of enrollment.

As yet another example, the present invention is not limited to implementations involving only two (primary and secondary) PINs. Rather, a primary PIN could be used to authenticate transactions, a secondary PIN could be used to subsequently validate transactions (in response to alert messages), and a third PIN could be used to access wallet server 140 in order to enroll in the alert program. Further, any one or all of the PINs could be data other than alpha-numeric digits. The term PIN is used for convenience only herein, and is not intended to be so limited. Rather, the term "PIN" is intended to include any other identity confirming features, such as biometrics (retina scans, finger prints, and so forth).

Therefore, the above description should not be taken as limiting the scope of the invention, which is defined by the appended claims.

What is claimed is:

1. A system for validating transactions that are conducted against accounts using a presentation instrument, where a customer may be required to provide an authentication PIN in order to complete a transaction, the system comprising:
    a memory for storing, in relation to an account, a post-transaction PIN that is separate from the authentication PIN, wherein the post-transaction PIN was previously supplied by the customer when enrolling for a service requiring entry of the post-transaction PIN in addition to the authentication PIN, wherein the entry of the post-transaction PIN is necessitated under a certain condition where the transaction is a suspect transaction;
    a customer device for receiving a message requesting the customer to enter the post-transaction PIN when a previously conducted transaction has been identified as meeting the certain condition, wherein the previously conducted transaction comprises transaction details, including the authentication PIN, that were previously supplied by the customer when initiating the transaction; and
    a processor for receiving the post-transaction PIN entered by the customer and for receiving the post-transaction PIN stored in the database, and for determining if the entered post-transaction PIN matches the stored post-transaction PIN when the entered post-transaction PIN matches the stored post-transaction PIN; and
    transmitting a message indicative of the match of the entered post-transaction PIN and the stored post-transaction PIN that were supplied by the same customer.

2. The system of claim 1, wherein the customer device is a mobile device, wherein the mobile device serves as the presentation instrument, wherein the memory is a database, and wherein the processor is a server.

3. The system of claim 2, wherein transactions are conducted at a POS device using the mobile device, and wherein the mobile device uses wireless signaling to provide identifying information to the POS device.

4. The system of claim 3, wherein the server receives the identifying information from the POS device, wherein the database stores an account ID for the account against which the transaction is conducted, and wherein the server accesses the account ID of the customer at the database in response to receiving the identifying information.

5. The system of claim 4, wherein server generates the message requesting the post-transaction PIN in response to flagging of the transaction by a financial institution maintaining the account, and wherein the financial institution flags the account in response to suspicious activity in connection with the account.

6. A method for validating completed transactions conducted by account holders, where the transactions have been conducted using a presentation instrument and where a least some transactions may have been authenticated using an authenticating PIN at the time of the transaction, the method comprising:
    establishing a second PIN to validate transactions conducted using the presentation instrument, wherein the second PIN is received from an account holder as part of a service requiring entry of the second PIN under a certain condition where the transaction is a suspect transaction;
    flagging a transaction that is to be validated based on whether the condition has been satisfied, wherein the flagged transaction has been previously completed and authenticated;
    sending a message to a mobile device associated with an account holder, the message requesting entry of the second PIN; and
    determining if the second PIN has been entered;
    determining if the entered second PIN matches the previously established second PIN; and
    storing a result indicative of the match of the entered second PIN and the previously established second PIN that were supplied by the same customer.

7. The method of claim 6, wherein the mobile device is the presentation instrument, and wherein the second PIN is entered at the mobile device.

8. The method of claim 7, wherein the authenticating PIN has been entered at the mobile device when conducting the transaction.

9. The method of claim 7, wherein where the authenticating PIN has been entered at a PIN pad located at a POS device.

10. The method of claim 7, wherein the mobile device uses wireless signaling to provide identifying information to a POS device at the location where the transaction is conducted.

11. The method of claim 10, wherein the wireless signaling employs NFC.

12. The method of claim 11, wherein where the wireless signaling is received by a reader at the POS device.

13. The method of claim 11, further comprising:
    providing a database, wherein the second PIN is stored in the database, where the second PIN is retrieved from the database, and where the retrieved second PIN is compared to the second PIN entered at the mobile device in response to the message.

14. The method of claim 13, wherein where the mobile device is a mobile telephone.

15. The method of claim 13, wherein the second PIN is established by the account holder.

16. The method of claim 13, wherein, the second PIN is different that the authenticating PIN.

17. The method of claim 13, wherein a mobile wallet server is provided to manage transactions using the presentation instrument, where the mobile wallet server manages account information that is retrieved when the identifying information provided by wireless signaling is received at the POS device, and wherein the wallet server retrieves the second PIN from the database in response to entry of the second PIN at the mobile device.

18. The method of claim 13, wherein a mobile wallet server is provided to manage transactions using the presentation instrument, and wherein the database is associated with the wallet server.

19. The method of claim 18, wherein a transaction is determined to be suspect based on criteria established an institution maintaining an account associated with the presentation instrument.

20. The method of claim 13, wherein the database is associated with a financial institution maintaining an account for the account holder.

21. The method of claim 6, wherein a transaction is flagged when the transaction is determined to be suspect based on meeting the condition.

22. The method of claim 21, wherein where the displayed information includes the amount of the transaction and the date it was completed.

23. The method of claim 6, wherein the mobile device displays information concerning the flagged transaction at the mobile device.

24. The method of claim 6, wherein the second PIN is determined to be not entered if not correctly entered within a predetermined period of time after receipt of the message at the mobile device.

25. The method of claim 6, wherein where the second PIN is established as part of enrollment in a program for receiving alerts.

* * * * *